(12) United States Patent
Yakubov

(10) Patent No.: US 8,467,114 B2
(45) Date of Patent: Jun. 18, 2013

(54) MULTIPASS COLOUR PRINTING

(75) Inventor: Igor Yakubov, Herzlia (IL)

(73) Assignee: Hewlett-Packard Industrial Printing Ltd., Netanya (IL)

(*) Notice: Subject to any disclaimer, the term of this patent is extended or adjusted under 35 U.S.C. 154(b) by 885 days.

(21) Appl. No.: 12/424,520

(22) Filed: Apr. 15, 2009

(65) Prior Publication Data

US 2010/0265521 A1 Oct. 21, 2010

(51) Int. Cl.
*H04N 1/60* (2006.01)
*H04N 1/46* (2006.01)
*G06K 9/00* (2006.01)
*B41J 2/04* (2006.01)
*B41J 2/115* (2006.01)
*G01D 11/00* (2006.01)

(52) U.S. Cl.
USPC ............. 358/502; 358/1.9; 382/162; 347/53; 347/80; 347/100

(58) Field of Classification Search
USPC .............. 358/1.9, 1.13, 1.1, 502, 523, 524, 358/536, 505, 514, 518; 382/162, 167, 165, 382/318; 347/24, 32, 43, 54, 75, 80, 100
See application file for complete search history.

(56) References Cited

U.S. PATENT DOCUMENTS

| | | | | |
|---|---|---|---|---|
| 5,992,962 A * | 11/1999 | Yen et al. | | 347/9 |
| 6,142,605 A * | 11/2000 | Serra et al. | | 347/43 |
| 6,157,461 A * | 12/2000 | Doron et al. | | 358/1.9 |
| 6,179,407 B1 * | 1/2001 | Bockman | | 347/40 |
| 6,254,217 B1 | 7/2001 | Askeland et al. | | |
| 6,299,284 B1 * | 10/2001 | Alfaro | | 347/43 |
| 6,312,098 B1 * | 11/2001 | Miquel et al. | | 347/41 |
| 6,854,828 B2 * | 2/2005 | de Pena | | 347/43 |
| 6,863,361 B2 * | 3/2005 | Barr et al. | | 347/19 |
| 6,965,452 B2 * | 11/2005 | Garcia et al. | | 358/1.9 |
| 7,472,983 B2 | 1/2009 | Fellingham et al. | | |
| 7,600,842 B2 * | 10/2009 | Hirano et al. | | 347/15 |
| 2002/0067392 A1 * | 6/2002 | Alfaro | | 347/41 |
| 2002/0149635 A1 * | 10/2002 | Askeland et al. | | 347/9 |
| 2003/0142162 A1 * | 7/2003 | Barr et al. | | 347/19 |
| 2004/0046816 A1 * | 3/2004 | Miquel et al. | | 347/15 |
| 2004/0046831 A1 * | 3/2004 | Hempel | | 347/43 |
| 2005/0083364 A1 * | 4/2005 | Billow | | 347/19 |
| 2005/0248606 A1 * | 11/2005 | Hoshiyama et al. | | 347/19 |
| 2006/0087527 A1 * | 4/2006 | de Pena et al. | | 347/12 |
| 2006/0181562 A1 * | 8/2006 | Hirano et al. | | 347/15 |
| 2009/0231617 A1 * | 9/2009 | Imai | | 358/1.15 |
| 2010/0238219 A1 * | 9/2010 | Rueby et al. | | 347/14 |

* cited by examiner

Primary Examiner — Madelein A Nguyen

(57) ABSTRACT

Disclosed is a system for printing an image comprising a plurality of pixels, the system comprising: a carriage arranged to make a plurality of passes along a scanning axis with respect to a print medium; a plurality of printheads mounted on the carriage, each printhead corresponding to a different ink color and comprising at least one ejection nozzle; and, a print controller configured to receive data defining for each pass zero or more locations at which to deposit each of the ink colors to produce each pixel; wherein the data is such that for at least one pixel, at least one of the ink colors is deposited at substantially more locations on one pass relative to the other passes.

20 Claims, 12 Drawing Sheets

PASS 204     INK COLOURS 202

| | C | | | | M | | | | Y | | | | K | | | |
|---|---|---|---|---|---|---|---|---|---|---|---|---|---|---|---|---|
| | 1 (F) | 2 (B) | 3 (F) | 4 (B) | 1 (F) | 2 (B) | 3 (F) | 4 (B) | 1 (F) | 2 (B) | 3 (F) | 4 (B) | 1 (F) | 2 (B) | 3 (F) | 4 (B) |
| 211 | 50 | 50 | | | 50 | 50 | | | 50 | 50 | | | 50 | 50 | | |
| 212 | 20 | 80 | | | 50 | 50 | | | 50 | 50 | | | 50 | 50 | | |
| 213 | 80 | 20 | | | 50 | 50 | | | 50 | 50 | | | 50 | 50 | | |
| 214 | 50 | 50 | | | 50 | 50 | | | | | 50 | 50 | 25 | 25 | 25 | 25 |
| 215 | 80 | | 20 | | 20 | | 80 | | 80 | | 20 | | | 20 | | 80 |
| 216 | 25 | 25 | 25 | 25 | 25 | 25 | 25 | 25 | 25 | 25 | 25 | 25 | 25 | 25 | 25 | 25 |

PRINTMODE 201

DEPOSITION PERCENTAGE 203

PRINTMODE PROFILE TABLE 200

| | C | | | | M | | | | Y | | | | K | | | |
|---|---|---|---|---|---|---|---|---|---|---|---|---|---|---|---|---|
| | 1 (F) | 2 (B) | 3 (F) | 4 (B) | 1 (F) | 2 (B) | 3 (F) | 4 (B) | 1 (F) | 2 (B) | 3 (F) | 4 (B) | 1 (F) | 2 (B) | 3 (F) | 4 (B) |
| 211 | 50 | 50 | | | 50 | 50 | | | 50 | 50 | | | 50 | 50 | | |
| 212 | 20 | 80 | | | 50 | 50 | | | 50 | 50 | | | 50 | 50 | | |
| 213 | 80 | 20 | | | 50 | 50 | | | 50 | 50 | | | 50 | 50 | | |
| 214 | 50 | 50 | | | 50 | 50 | 50 | | | | 50 | 50 | 25 | 25 | 25 | 25 |
| 215 | 80 | 50 | 20 | | | 20 | | 80 | 80 | | 20 | | 25 | 20 | 25 | 80 |
| 216 | 25 | 25 | 25 | 25 | 25 | 25 | 25 | 25 | 25 | 25 | 25 | 25 | 25 | 25 | 25 | 25 |

PRINTMODE 201

PASS 204

INK COLOURS 202

DEPOSITION PERCENTAGE 203

PRINTMODE PROFILE TABLE 200

FIGURE 2

MULTIPASS COLOUR PRINTING

FIELD OF THE INVENTION

The present invention relates to apparatus and methods for printing high-resolution colour text and/or graphics on printing media such as paper or transparency stock. More specifically, but not exclusively, the present invention relates to an apparatus and method providing improved print quality in multipass and/or bidirectional swath colour inkjet printing.

BACKGROUND OF THE INVENTION

Inkjet printers have found widespread use in businesses and homes, in part due to their relatively low cost, high print quality and colour printing capability. Inkjet printers operate by depositing drops of one or more inks onto a print medium such that in combination the drops form the desired image. Deposition of the ink drops is governed by one or more printheads, which are each connected to an ink supply and contain an arrangement of nozzles and a mechanism which is adapted to control ejection of ink drops from each individual nozzle. Typically, each printhead may comprise an array of addressable piezoelectric and/or heating elements corresponding to each nozzle. Each element can be individually charged in order to superheat a small quantity of ink which is subsequently ejected via the corresponding nozzle. The one or more printheads may be housed in a print cartridge (or alternatively each printhead may be housed in a separate cartridge), which may either contain the supply of ink for each printhead (for so-called 'on-axis' printers) or be connected to an ink supply located externally of the cartridge (for so-called 'off-axis printers). Typically, an inkjet printer will comprise a number of different ink colours which are used in combination to produce a wide range of image colours on the print medium. An inkjet printer may include four print cartridges but may include more or fewer as is appropriate for the intended application. Typically, the print heads are mounted side-by-side in a carriage which scans in a forward and a backward direction above and relative to the print medium during printing such that the cartridges move sequentially over a given location on the medium which is to be printed. Upon each scan, the one or more printheads can address a width of the print medium corresponding to the layout of the nozzles on each cartridge, thus forming a swath. The printer also has a print medium advance mechanism which moves the medium relative to the printhead so that, by combining successive scans of the print cartridges back and forth across the medium with the advance of the medium relative to the printhead, the entire printable area of the medium can be printed using a plurality of swaths.

Each printhead deposits ink of a different colour on the medium. In one commonly used arrangement, the inks are the subtractive colours cyan (C), magenta (M) and yellow (Y). Alternatively the printer can use more than three colour inks, some of which are lighter and darker versions of a given colour shade. Often, there is also a black ink (K), drops of which may be used during colour printing to form the darker shades of colours. Drops of the colour inks can be combined at substantially the same location to form a range of perceived colours to the human eye. For example, superimposing drops of magenta and cyan in the same pixel location produces a purple colour pixel.

In digital form, a colour image may be encoded in a particular colour space, the most common of which is the RGB colour space. Prior to printing the image it much first be converted from its native input colour space to the device colour space appropriate for the printer. For example, an image encoded in the RGB colour space, which is to be printed using a printer with cyan, magenta, yellow and black inks (CMYK), must first be converted to the CMYK colour space.

Typically, the resolution at which an image is to be printed is measured in pixels per inch (ppi). Conversely, the resolution at which a printhead can deposit ink on the print medium is typically measured in dots per inch (dpi) and is governed by the geometry of the printhead (namely the nozzle arrangement). Generally, the dpi value is several times the ppi value in order to ensure accurate representation of the image. For example, an image at 600 ppi may be printed using a printer at a resolution of 2400×1200 dpi, where each image pixel corresponds to a 4 by 2 array of device pixels.

In order to increase the number of colour shades that can be printed, it is common to use halftone techniques for each of the subtractive colours. Halftone techniques use a pattern of dots in combination to simulate a continuous tone of an image as perceived by the human eye at macroscopic level. Thus, the colour of each image pixel is simulated at the dot level using a halftone image for each ink. Generation of each halftone image may be performed using software or hardware implemented methods, as is established in the art.

Some printers operate in a mode in which they only deposit ink while scanning in one direction; for example, in the forward pass but not the backward pass. This print mode is known as unidirectional printing. Conversely, some printers have a mode in which they deposit ink while scanning in both directions, known as bidirectional printing. Bidirectional printing has the advantage of reduced printing time, because it avoids the wasted motion of moving the carriage in the backward direction without printing required for unidirectional printing.

The gamut of a printer refers to the range of colours which can be produced by the device. In order to accurately reproduce all colours contained in an image, it is desirable to maximise the gamut of the printing device. Accordingly, a need exists for a methods and apparatus that can maximise the achievable gamut of printing devices.

BRIEF DESCRIPTION OF THE DRAWINGS

Features of the invention will become apparent from the following description of embodiments of the invention, given by way of example only, which are made with reference to the accompanying drawings:

FIG. 2 is table illustrating a plurality of printmodes in accordance with an embodiment of the present invention.

DETAILED DESCRIPTION OF THE INVENTION

The gamut which can be achieved by a printing system is sensitive to the order by which the inks are deposited onto the print medium due to interactions between the composite inks and the print medium (for example, imperfect ink transparency). For prior art bidirectional printing, the fixed arrangement of the colour printheads leads to a fixed ink deposition order in the forward and backward directions, and consequently the device gamut differs in each direction. It is therefore only possible to use the gamut common to both the forward and backward passes if colour inconsistencies are to be minimised, and consequentially, the overall gamut of the printer device is limited.

Moreover, where two ink drops are superimposed on the medium, the resulting perceived colour will differ depending on the deposition order. Thus for bidirectional printing, a fixed arrangement of print cartridges in the carriage causes a differing order of drop deposition for the forward and backward passes, leading to hue shift between different regions of what should be the same colour. For example, in a typical inkjet printer, the cyan, black, magenta, and yellow printheads are aligned side-by-side in the carriage. When the carriage sweeps in the forward direction the yellow printhead passes over a particular location first, followed by the magenta, the black, and finally the cyan. If a blue colour is to be printed at a particular location, the magenta drop would be deposited before the cyan. In contrast, when the carriage sweeps in the backward direction, the cyan drop is deposited before the magenta. The hue shift problem is most noticeable when a contiguous area of pixels spanning more than one scan of the carriage over the medium is printed with the same composite colour, in particular a deep shade of two primaries such as blue or green (green is produced by combined cyan and yellow drops). This printing operation produces perceptibly different bands of colour shades between swaths generated by printing in the forward direction followed by the backward direction, and swaths generated by printing in the backward direction followed by the forward direction. However, if a unidirectional printing is adopted, the inkjet printer is restricted to the gamut corresponding to the fixed deposition order.

Figure 1A:
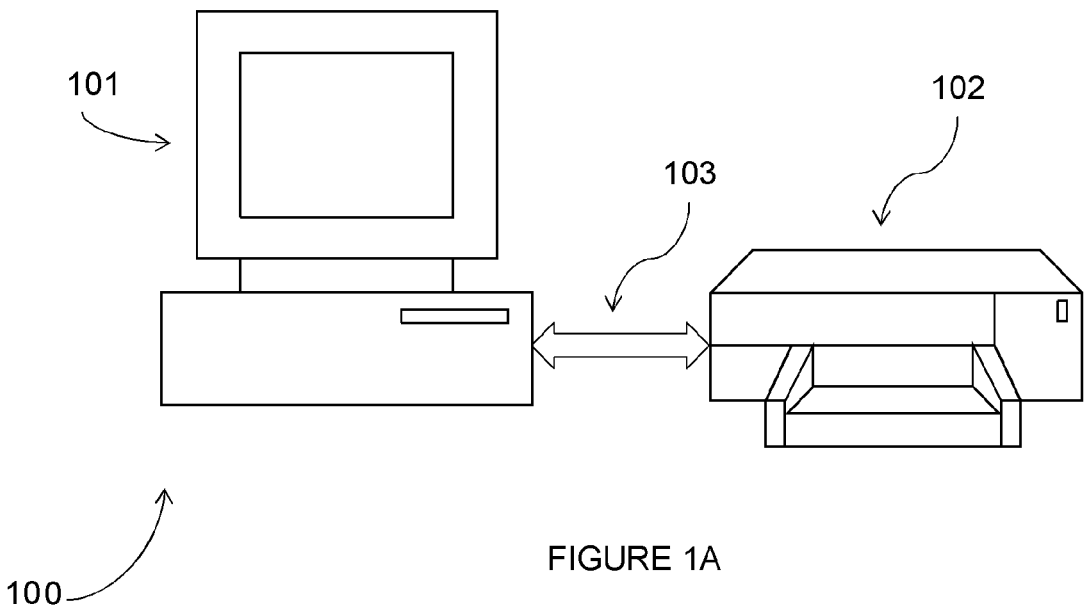
FIG. 1A is a schematic diagram of a system for printing an image in accordance with an embodiment of the present invention.

FIG. 1A shows a system 100 for printing an image in accordance with embodiments of the present invention. A personal computer 101 is operably connected to an inkjet printing device 102 via connection 103. Connection 103 may be a wired connection such as USB, Firewire® or the like. Alternatively, connection 103 may be a wireless connection using a suitable protocol such as IEEE 802.11x or similar. Moreover, the connection may either be a direct connection between devices or may be indirect via a network. The personal computer 101 is arranged to receive or generate image data and to control printer 102 to produce a print of the image. Alternatively or additionally, the printing device 102 may receive the image data directly from a peripheral device such as a digital camera via a Bluetooth®, iRDA, USB or other suitable connection. Alternatively of additionally, the printing device may include one or more memory slots so that image data can be received from a solid state device such as a Micro SD card, compact flash medium or similar.

Figure 1B:
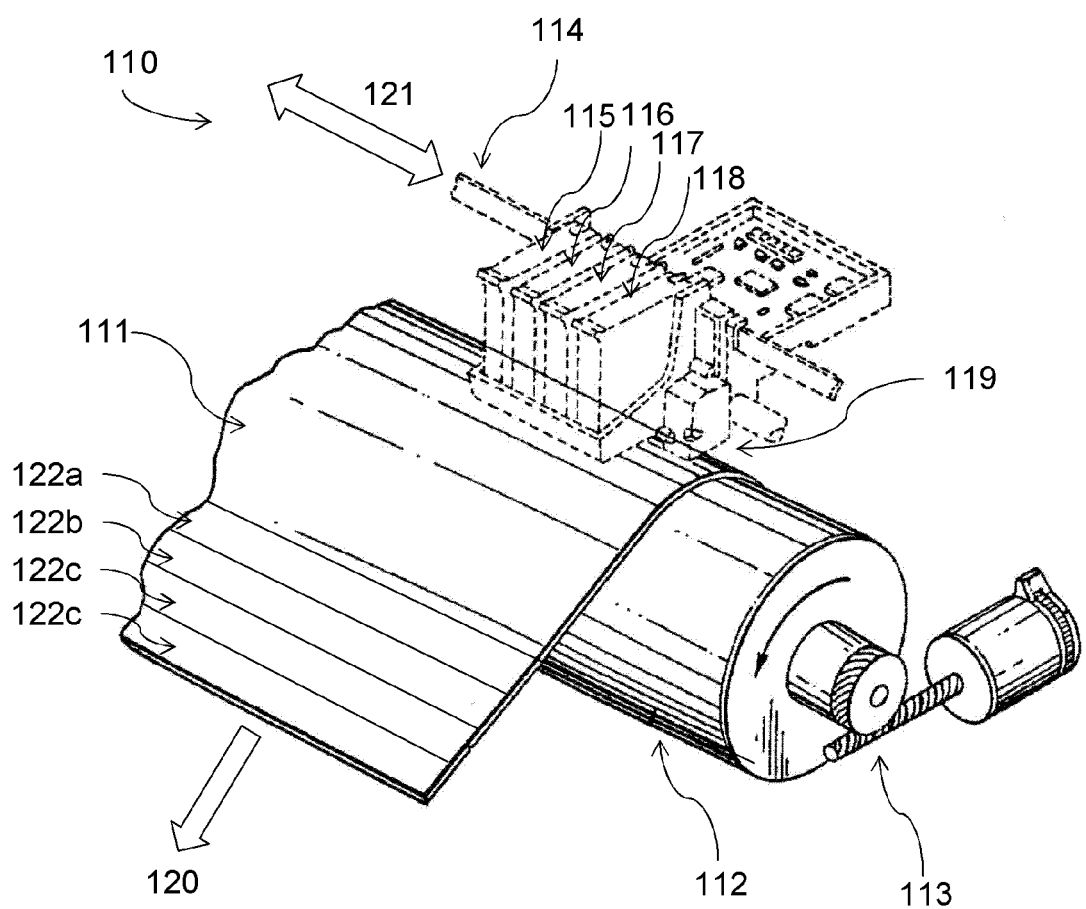
FIG. 1B is a schematic diagram of a system for printing an image in accordance with an embodiment of the present invention.

Printing device 102 comprises a printing mechanism 110, an embodiment of which is shown in FIG. 1B. Print medium 111 is advanced relative to the print carriage 119 on a cylindrical platen 112 which is driven by motor and worm gear 113. Print carriage 119 houses four ink cartridges, each cartridge containing a composite ink corresponding to one of the four subtractive colours: cyan 115, magenta 116, yellow 117 and black 118. The print carriage can be manipulated in a forward and backward direction perpendicular to the print medium feed direction 120, as indicated by axis 121. Manipulation of the print carriage 119 is controlled by encoder belt 114 which is typically driven by an electric motor or equivalent actuator (not shown), such that the print cartridge can be positioned with high precision. Thus by combined operation of the cylindrical platen 112 and print carriage 119, it is possible to deposit ink drops at essentially all locations on the print medium 111.

When printing an image on the print medium 111, the print carriage 119 makes a number of passes along axis 121, in the forward and backward direction with respect to the print medium 111. Typically, the printing device 110 operates in a swath type print mode, whereby the print medium 111 is advanced by a distance substantially equivalent to the width of a print head after the carriage has completed a plurality of passes with respect to the print medium. In this manner the printed image is constructed in what are commonly known as swaths, as indicated by 122a-c in FIG. 1B. Alternatively, in some embodiments of the invention, the print medium may be advanced by a distance less than, but a fraction of the width of a print head after each pass to form a series of subswaths. For example, the print medium 111 could be advanced by a distance equal to one quarter of the width of the print head after each pass, such that any particular point on the printed image will be formed from a group of four successive subswaths.

The printing device 102 is arranged to operate according to a plurality of printmodes, each printmode defining the direction and number of passes of the carriage to be made over a particular area of the image to be printed, and a proportion of each colour ink to be deposited on the area to be printed on each of the defined passes. Additionally, the printmode may also define the print medium advance between successive passes of the print carriage.

A particular printmode can be unidirectional, bidirectional or a hybrid printmode combining unidirectional and bidirectional printmodes. In a unidirectional printmode, ink is deposited on either the forward or backward passes only. For example, according to an exemplary unidirectional printmode comprising two passes, ink is deposited on the forward pass only, and no ink is deposited when the carriage returns in the backward pass. Moreover, the printing device 102 can print according to a hybrid printmodes whereby a given swath or subswath can be printed using a plurality of passes and a combination of unidirectional and bidirectional printing. Alternatively or additionally, in a particular hybrid printmode, each of the composite inks may be deposited using a particular combination of passes. For example, in a four pass hybrid print mode, yellow ink may be deposited on each of the four passes but the cyan ink may be printed on only the final backward pass. Printing device 102 is arranged to operate according to a plurality of printmodes, which may include a combination unidirectional, bidirectional or hybrid printmodes. The printing device 102 is arranged to switch between printmodes such that each swath or subswath can be printed according to a desired printmode.

FIG. 2 shows a table 200 containing a plurality of printmodes 201. The table 200 defines six printmodes 211-216, wherein each printmode defines on which of the passes of the print carriage each of the composite inks 202 is deposited, and the percentage of each ink (deposition percentage 203) which is deposited on a particular pass 204 (forward passes denoted by F, backward passes denoted by B). Printmode 211 corresponds to a typical prior art two pass bidirectional printmode whereby an equal amount of each ink is deposited on the forward and backward passes. Printmode 212 defines a printmode identical to that of 211 with the exception that only 20 percent of the cyan ink is deposited on the forward pass and the remaining 80 percent is deposited on the backward pass. Conversely, printmode 213 defines a mode whereby 80 percent of the cyan ink is deposited on the forward pass and the remaining 20 percent is deposited on the backward pass. Printmode 214 defines a printmode whereby the cyan ink is deposited equally on the first and second passes (forward and backward respectively), the magenta ink is deposited equally on the second and third passes (backward and forward respectively), the yellow ink is deposited on the third and fourth passes respectively (forward and backward respectively) and the black ink is deposited equally over all four passes. According to printmode 215, 80 percent of the cyan and yellow inks are deposited on the first pass (forward) and 20 percent is deposited on the third pass (forward), whereas 20 percent of the magenta and black inks are deposited on the second pass (backward) and the remaining 80 percent is deposited on the second pass (backward). Finally, printmode 216 defines a printmode whereby 25 percent of each ink is deposited on each of the four passes. The printmodes defined in 212-215 are herein termed asymmetric printmodes owing to the non-uniform ink deposition between colours and between passes.

The deposition percentages defined in printmode table 200 refer to a macroscopic measure of ink coverage. Typically, at any particular device pixel location only one drop of each colour ink will be deposited to generate the image and the deposition percentage is essentially 0 or 100 percent. It is therefore necessary to define the deposition percentage over an area encompassing a plurality of device pixels or locations. Moreover, the deposition percentage refers to the percentage of ink necessary to deposit a particular location to produce the target image.

It will be apparent to a person of ordinary skill in the art that the printmodes shown in FIG. 2 are provided by way of example only, and any number of printmodes with varying number of passes and deposition proportions are possible and encompassed within the scope of the present invention. Moreover, it is envisaged that further embodiments of the invention may encompass one or more printmodes whereby more or less than 100 percent of one or more of the inks is deposited in a particular printmode.

Each of the printmodes defined in table 200 are associated with a colour gamut which is the set of colours which can be printed using the corresponding printmode. As described above, interactions between the composite inks (ink-ink interactions) and between the ink and the print medium (ink-medium interactions) mean that the order by which the ink is deposited and the proportions thereof effect the gamut for a particular printmode, and consequently the gamut for the printing device. Moreover, for a given colour defined in CMYK colour space, the output colour (printed colour) will vary depending on the printmode used, despite laying down substantially the same quantity of each colour ink.

Figure 3:
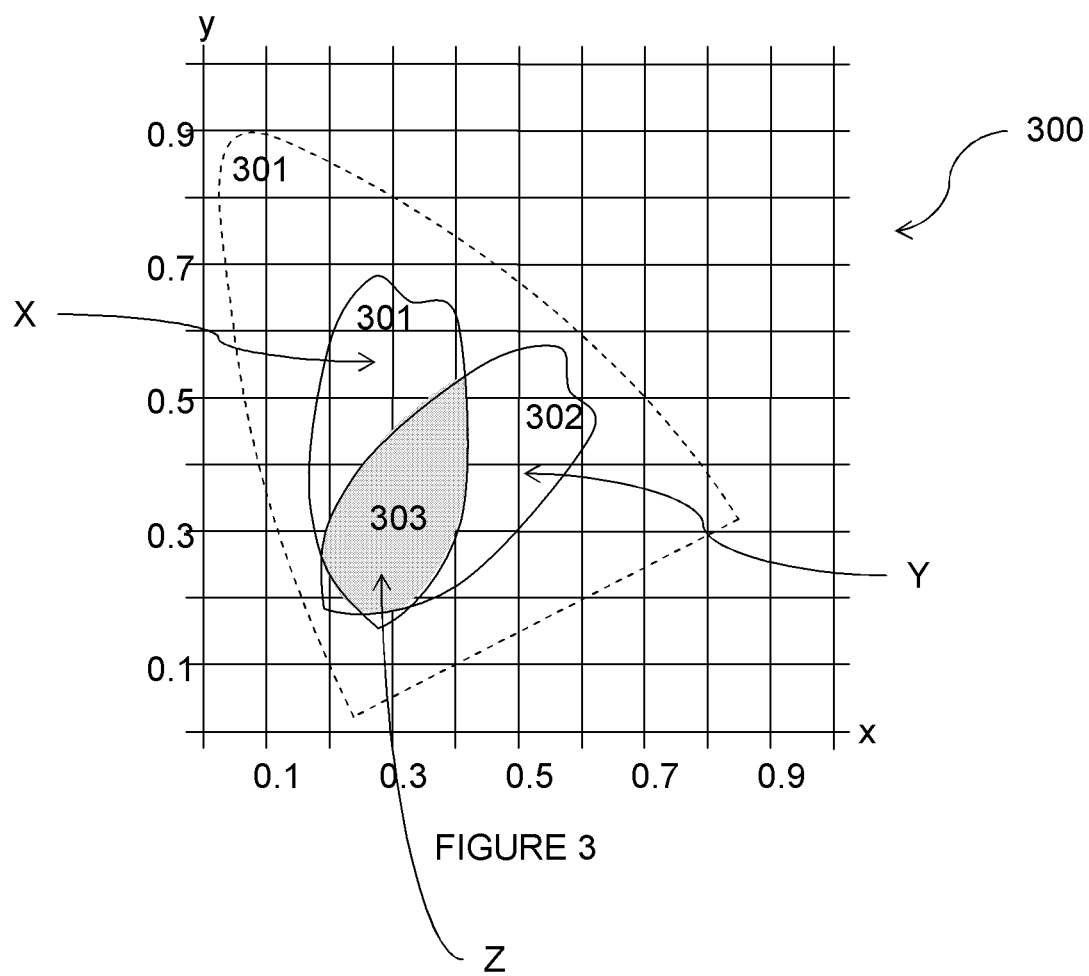
FIG. 3 is a CIE diagram representing the gamut of two example printmodes in accordance with an embodiment of the present invention.

FIG. 3 is a CIE (International Commission on Illumination) diagram representing the gamut of two example printmodes 301 and 302 for an embodiment of the present invention. The shaded area 303 represents the range of colours common to both printmodes and the area defined by dashed line 301 represents the nominal range of colours viewable by the human eye.

Embodiments of the present invention select the optimal printmode to print a specified image area based on the intended colour of the specified area (herein termed the target colour). For example, if the target colour for a particular area is located at position X in the CIE diagram 300, the printmode corresponding to gamut 301 will be selected for that area. Conversely, if the target colour is located at position Y in the CIE diagram 300, then the printmode corresponding to gamut 302 will be selected. Thus by selecting the most appropriate printmode to produce a particular target colour, the inherent colour gamut of the printing device is advantageously expanded and it is thus possible to print a range of colours beyond that of a prior art printing device.

Alternatively or additionally, embodiments of the invention can select a printmode such as to minimise the banding problem caused by hue shift (colour asymmetry) in bidirectional printing. Colour asymmetry can be minimised by selection of a printmode which defines asymmetric deposition of one or more of the colour inks on the forward and backward passes. If it is determined that a particular colour to be printed is susceptible to colour banding, an appropriate printmode can be selected in order to minimise this problem. For example, if the target colour is located at position Z in the CIE diagram 300 (corresponding to two possible printmodes), the printmode which minimises the visual banding caused by hue shift may be selected. In effect, the CIE diagram 300 provides a mapping between a target colour to be printed at a particular area, and the optimal printmode to be used at that area.

The CIE diagram 300 shown in FIG. 3 includes the gamut for only two printmodes, and it will be apparent to a person of ordinary skill in the art that any number of printmodes (and associated gamuts) can be incorporated within the scope of the present invention. Thus, a large set of printmodes can be selected such as to maximise the overall gamut for the print device, thereby effecting an increased range of colours and reduced banding for the printing device.

Figure 4A:
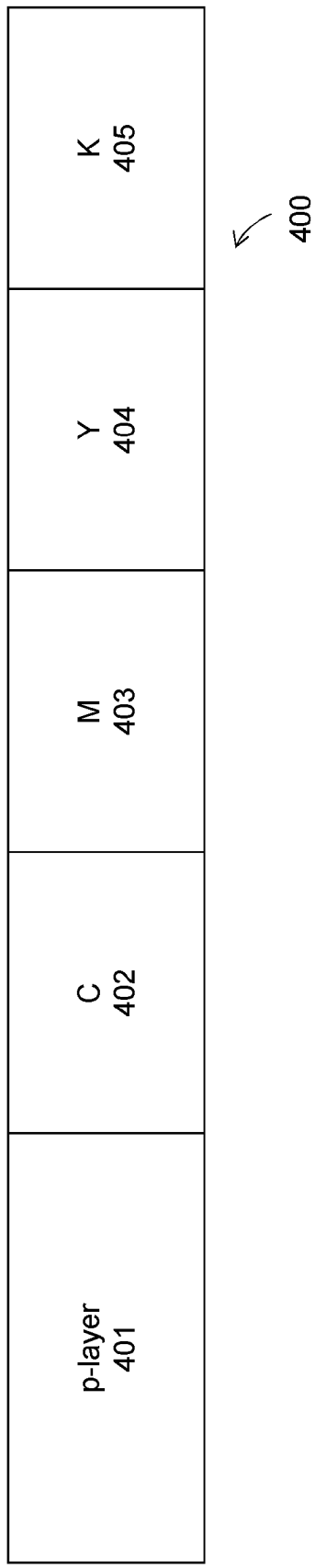
FIG. 4A is a schematic diagram of the pCMYK data format in accordance with an embodiment of the present invention.
Figure 4B:
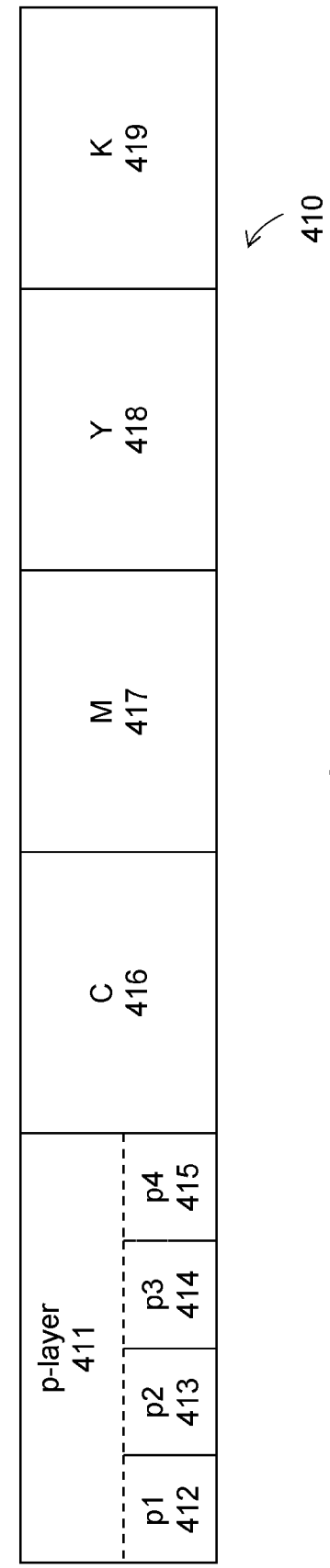
FIG. 4B is a schematic diagram of the pCMYK data format in accordance with an embodiment of the present invention.

Information associated with the selected optimal printmode for each pixel of the image is incorporated as an additional layer in the device colour space, herein termed a p-layer. A printing device equipped with the four subtractive inks CMYK has an augmented colour space pCMYK and each pixel of the image will include additional p-data associated with the optimal printmode for that particular pixel. FIG. 4A illustrates the pCMYK data format in schematic form and shows the separation 400 into the p-layer 401, cyan 402, magenta 403, yellow 404 and black 405 components. Typically, each CMYK data (402-405) may be defined as an 8-bit integer (taking a range of 0-255), as is standard in the art. In embodiments of the invention, the p-data also takes the form of an 8-bit integer which represents an identifier corresponding to a specific printmode, such as one of those defined in FIG. 2. Alternatively, the p-layer may contain one or more parameters which completely define the printmode for the particular image pixel in question, as is shown in FIG. 4B. The pCMYK format shown in FIG. 4B includes a p-layer 411 which defines a number of parameters p1-p4 (412-415) which are used to define the printmode for the particular pixel. The p-layer 411 can be implemented according to a wide range of formats and all such formats are intended to be within the scope of the present invention.

Conversion from the input colour space to the device colour space pCMYK is performed by a colour management module (CMM) using a profile connection space (PCS) which will typically be the CIELAB (International Commission on Illumination L* a* b*) colour space. The conversion is achieved using one of a plurality of input ICC (International Colour Consortium) profiles corresponding to the input colour profile of the target image. The input ICC profile provides a mapping from the input colour space to the PCS, and by use of an appropriate input ICC profile, a large number of differing input colour profiles can be mapped to the PCS.

Conversion from the PCS to the pCMYK colour space can be performed using a number of different methods. In the present embodiment, the conversion is achieved using an output ICC profile which is augmented with data which defines a mapping to the printmode p-layer. For example, the output ICC profile may be based on a standard ICC profile for mapping from the image colour space to the printer CMKY colour space, with additional data defining how a colour in the PCS colour space is mapped to a particular printmode. In alternative embodiments, mapping to the appropriate printmode may be achieved by reference to the gamut profile for each printmode, or a single gamut profile encompassing all printmodes, and data relating regions of the gamut profile to one or more printmodes. Alternatively, the CMM may be configured to select the appropriate printmode identifier using an algorithm which accounts for the ink-ink and ink-medium interactions and determine optimal printmode for any particular PCS colour.

Figure 5:
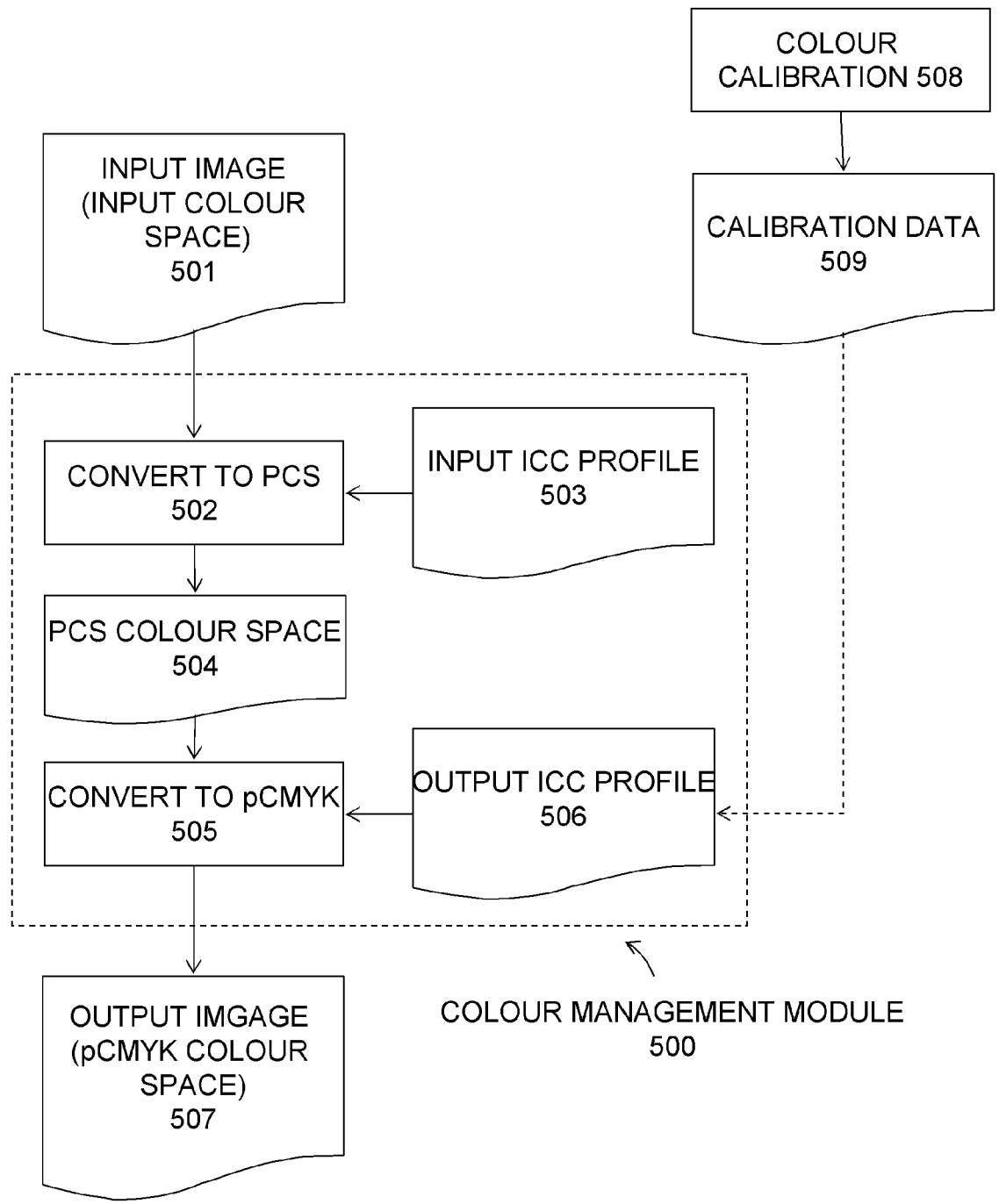
FIG. 5 is flow diagram of a method of converting an image from an input colour space to the pCMYK colour space in accordance with an embodiment of the present invention.

FIG. 5 shows a method of converting an image from an input colour space to the pCMYK colour space in accordance with an embodiment of a CMM 500. The input image colour space 501 is first converted to the PCS colour space 504 [step 502]. The conversion is done with reference to an input ICC profile 503 defining the mapping between the input colour space 501 and the PCS colour space 504. Next, the PCS colour space is converted to the pCMYK colour space 507 [step 505], using the output ICC profile 506, which contains additional data defining a mapping to the plurality of printmodes as defined in the p-layer of the pCMYK colour space. The output ICC profile is generated a priori in a colour calibration step [step 508] (producing calibration data 509), which is used in the generation of the output ICC profile 506.

Figure 6:
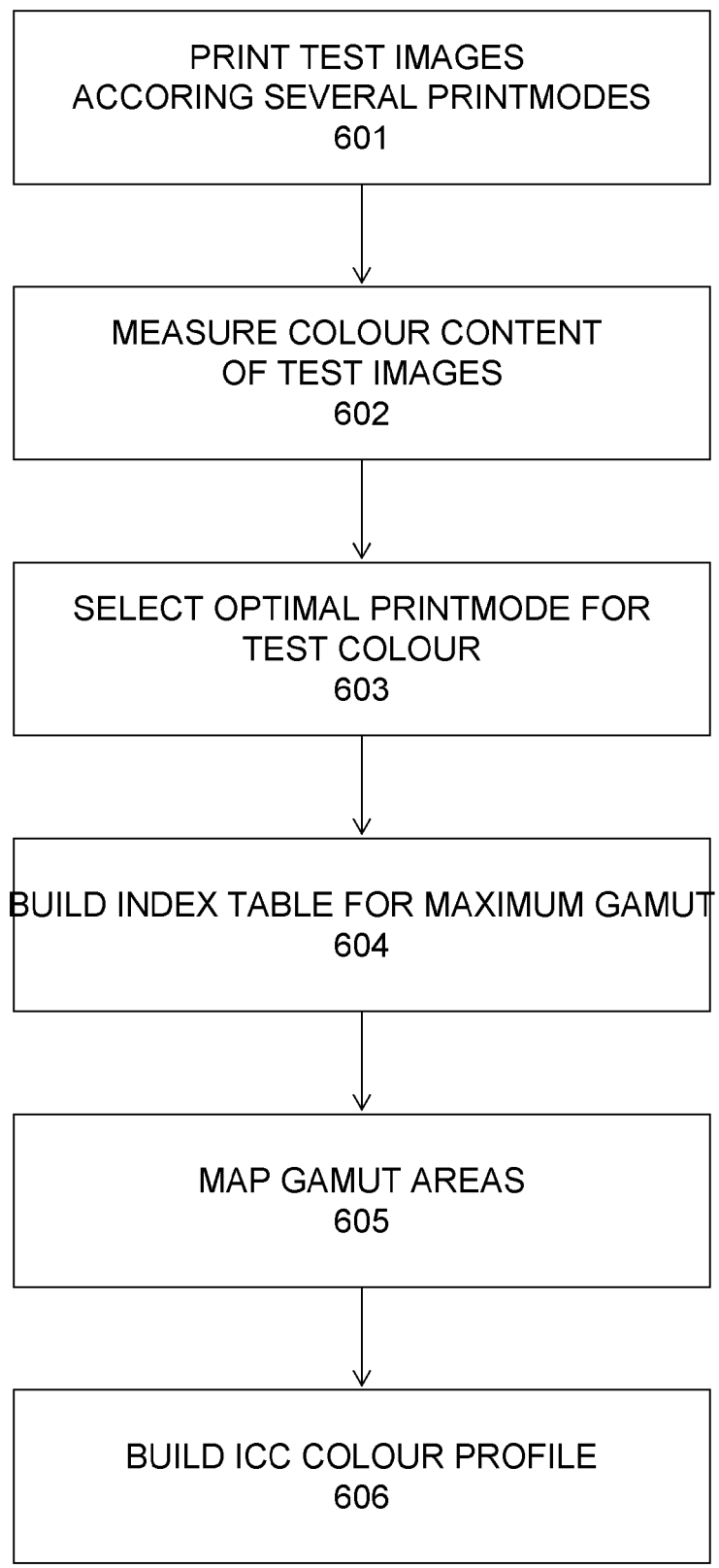
FIG. 6 is a flow diagram of a method of constructing an output ICC profiles in accordance with an embodiment of the present invention.

An empirical method of constructing the output ICC profile 506 in accordance with an embodiment of the present invention is now described with reference to the flow diagram of FIG. 6. First, a particular target colour defined in CMYK colour space is printed using plurality of printmodes of which there will typically be at least one asymmetrical printmode [step 601]. The colour content of each of the printed images is then measured using a suitable calorimetric calibration device [step 602] and the printmode which reproduces the colour most accurately is selected (for example on the basis of lightness, chroma and/or hue) [step 603]. Alternatively or additionally, the printmode can be chosen to minimise banding due to hue shift or on the basis of one or more additional quality parameters. By performing this calibration for a plurality of target colours an overall optimum gamut can be generated [step 604] and indexed by printmodes as selected in step 603. Next, each region of the optimum gamut profile is mapped to the optimal printmode [step 605] and the mapped gamut is used to generate the output ICC colour profile [step 606]. It will be appreciated by a person of normal skill in the art that performing a calibration for every colour in a gamut profile is generally not feasible in most situations, and typically the mapping can be achieved using a subset of the available colours sufficient to obtain the desired print quality.

Figure 7:
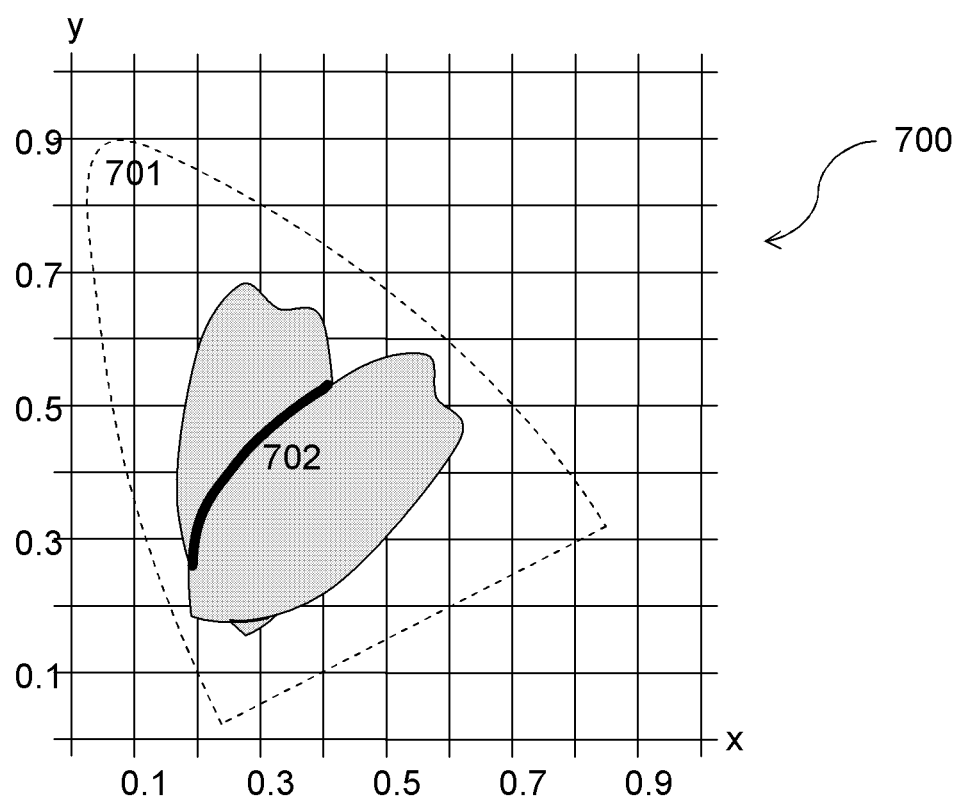
FIG. 7 is a CIE diagram showing the extended gamut for a printing device operating in accordance with an embodiment of the present invention.

FIG. 7 is a CIE diagram showing an extended gamut for a printing device operating in accordance with embodiments of the present invention. The illustrated gamut corresponds to the two printmodes illustrated in FIG. 3. However, the individual gamuts of the two printmodes 301 and 302 are mapped such that the overall gamut of the printing device is that shown by the shaded area 702.

At this stage of the process, the image in pCMYK format is still defined in terms of substantially continuous colour tones (contone). For example each colour component may be represented by an 8-bit integer corresponding to 256 discrete tone levels (overall 32-bit colour depth). However, the printing device can only produce ink drops in the four composite CMYK colours. Therefore, at each device pixel the printing device can produce a 1-bit colour tone for each composite colour (colour or no colour). To overcome this problem, it is common to employ halftone techniques to simulate a continuous range of colours when perceived by the human eye. Typically, this will involve scaling the image in pCMYK format to account for the native device pixel resolution of the printing device, such that a single image pixel in pCMYK format is mapped to a plurality of device pixel locations. In embodiments of the present invention, the p-layer data is also scaled to the native device pixel resolution so that the printmode information remains associated with the correct area of the halftone image.

Figure 8:
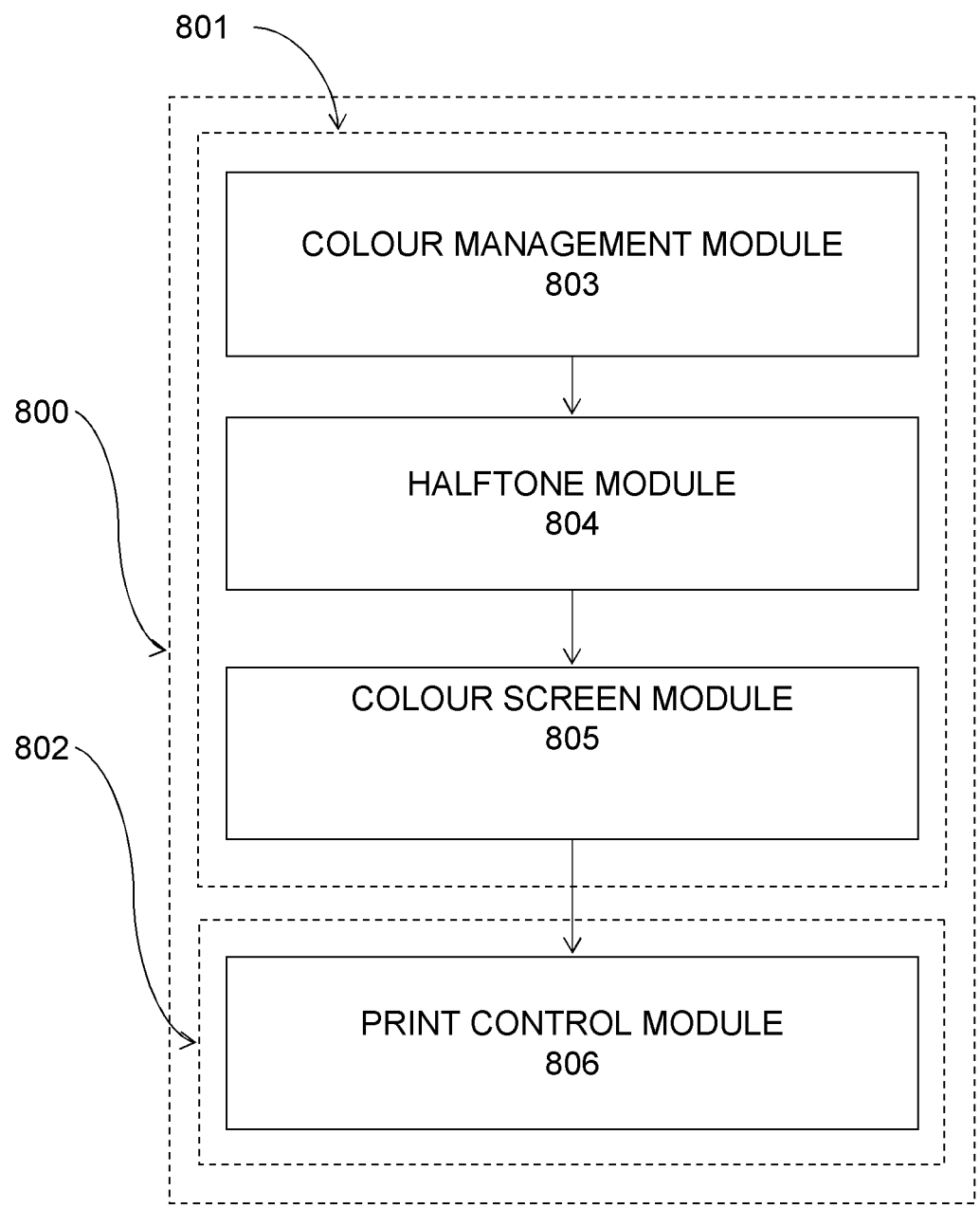
FIG. 8 is a schematic diagram of a system for printing an image according to an embodiment of the present invention.

FIG. 8 shows a system 800 for printing an image according to an embodiment of the present invention. The system comprises an attached device 801 (for example the personal computer 101 of FIG. 1A) which is operably connected to the printing device 802. The attached device 801 comprises a CMM 803, a halftone module 804 and a colour screen module 805. The printing device 802 comprises a print control module 806.

Following conversion of the input image from the input colour space to the pCMYK device colour space, performed by the CMM 803, the image data in pCMYK format is sent to the halftone module 804. The halftone module 804 generates the halftone image for each of the composite colour inks used in the printing device. The halftones are used to simulate continuous colour tone through use of colour dots, varying in either size or spacing, such that at macroscopic level the composite colour inks blend to produce a large range of colour tones when perceived by the human eye. The halftone process typically is performed at a sub-scale of the image pixel level such that, for example, the colour of a single image pixel may be approximated using a grid of 64 by 64 device pixel locations, where each device pixel corresponds to the area addressable by a single printhead nozzle or element. Thus the halftone image specifies where, at device pixel level, the individual dots of each colour ink should be deposited in order to approximate the colour of the image pixel. It will be appreciated by a person of ordinary skill in the art that the details of the halftone process are well established in the art, and that any suitable halftone process can be utilised. Hence, the scope of the present invention is intended to incorporate all suitable halftone methods.

Following the halftone process, the halftone image data for each ink colour and the corresponding p-layer data are sent to the colour screen module 805. The colour screen module 805 is arranged to further separate the halftone images into a separate colour screen for each pass of the print device. The set of colour screens for each colour ink determine which of the device pixels for the image are printed on each pass of the print carriage, based on the p-layer data and associated printmode. For example, in a four pass bidirectional printmode, each colour will have four colour screens corresponding to each of the passes. The ratio by which the active device pixels are allocated to each of the screens is determined by the p-layer data and associated printmode for each area of the image. For example, if a given area is to be printed according to the two pass bidirectional printmode 212 of FIG. 2, the colour screen module allocates 20 percent of the active pixels to the first cyan screen and 80 percent to the second cyan screen. In some embodiments of the invention, the colour screens are generated using a plurality of masks which are applied to the halftone image data to ensure the correct ratio of active device pixels in each of the colour screens for each area of the image. The masks are generated statistically on the basis of the p-layer data and associated printmodes. However, it is envisaged that further embodiments of the invention will incorporate other suitable methods for generating appropriate masks. Further embodiments of the invention may employ predefined masks to a part of, or entire colour screen. This may save processing time and consequently lead to improved print speed.

It should be noted that the p-layer data defining the printmode varies spatially with the image. Thus, the properties of the mask are not necessarily spatially homogenous and are defined on an image pixel basis or other suitable scale. Thus, the laydown order and ink percentage can be optimised for each pixel of the image.

In some embodiments of the invention, all printmodes employed by the printing device correspond to a single mode of operation (for example two pass bidirectional). However, other embodiments may employ various different modes of operation, and in such cases it is possible that different areas of the image will be associated with different modes of operations (as defined by the p-layer). In this case, the colour screen module determines the maximum number of passess to be made by the carriage, and generates the appropriate number of colour screens and associated masks. It may be the case that, in areas of the image where the specified printmode requires fewer passes than the maximum, some of the print colour screens are rendered redundant for those areas (ie no ink will be deposited on some of the passes).

After the colour screens have been generated they are sent to the print device 802 where they are received by the print control module 806. The print control module 806 is arranged to operate the print carriage and the individual nozzles of each print head based on the colour screens received from the colour screen module.

Figure 9:
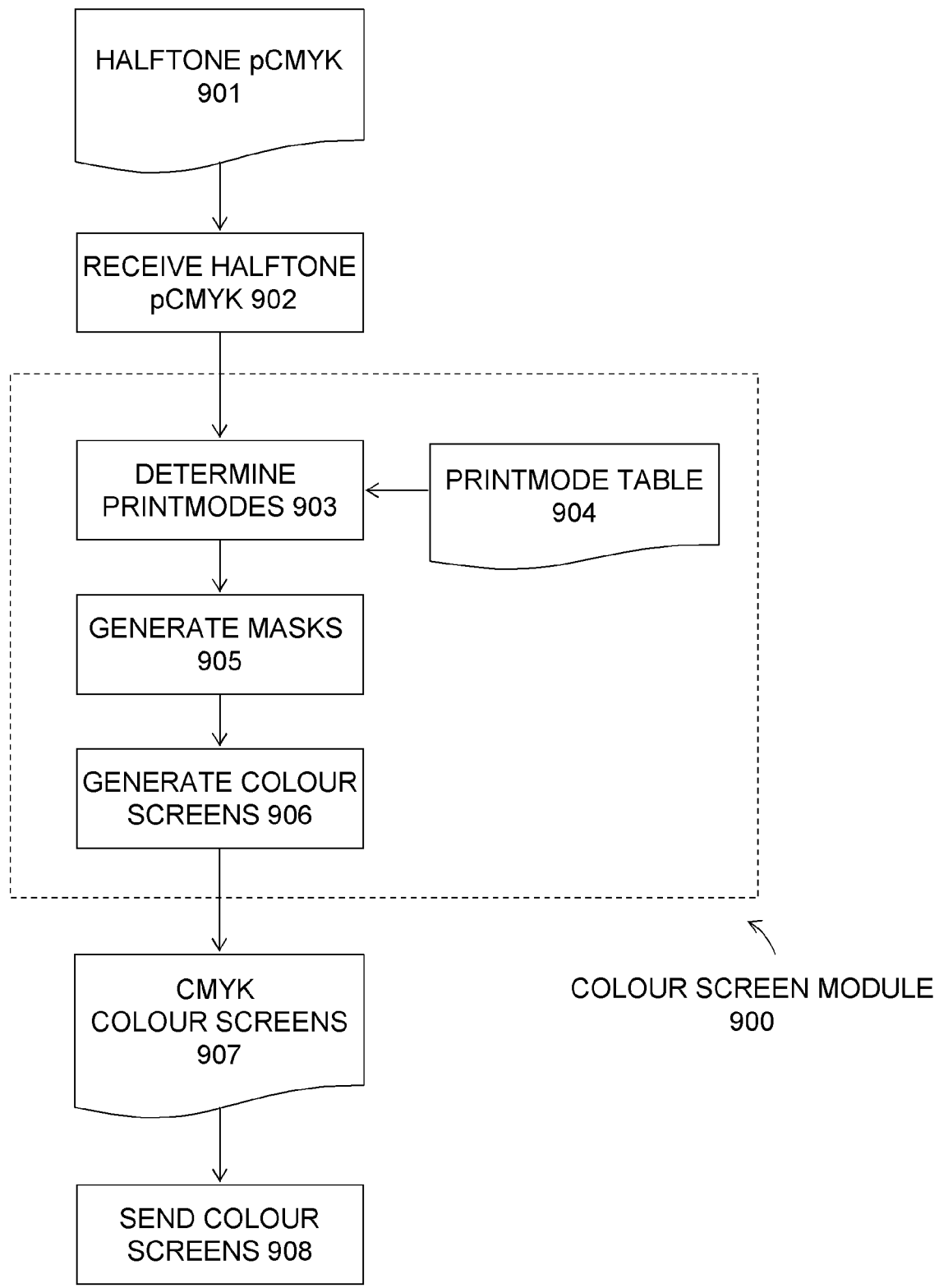
FIG. 9 is a flow diagram of a method of generating a plurality of colour screens in accordance with an embodiment of the present invention.

FIG. 9 shows a method of generating the plurality of colour screens in accordance with an embodiment of the colour screen module 900. The colour screen module 900 receives the halftone data in pCMYK format 901 [step 902] and determines the appropriate printmode for each particular area [step 903]. Typically, the determination step 903 will comprise retrieving the printmodes from printmode table 904 which correspond to the printmode p-layer for the area in question. Once the printmode has been determined, a set of masks is generated in accordance with the printmode parameters [step 905]. Next, the masks are applied to the halftone image to produce a set of colour screens 907 for each pass [step 906]. Finally, the colour screens 907 are sent to the printing device for printing [step 908].

Figure 10:
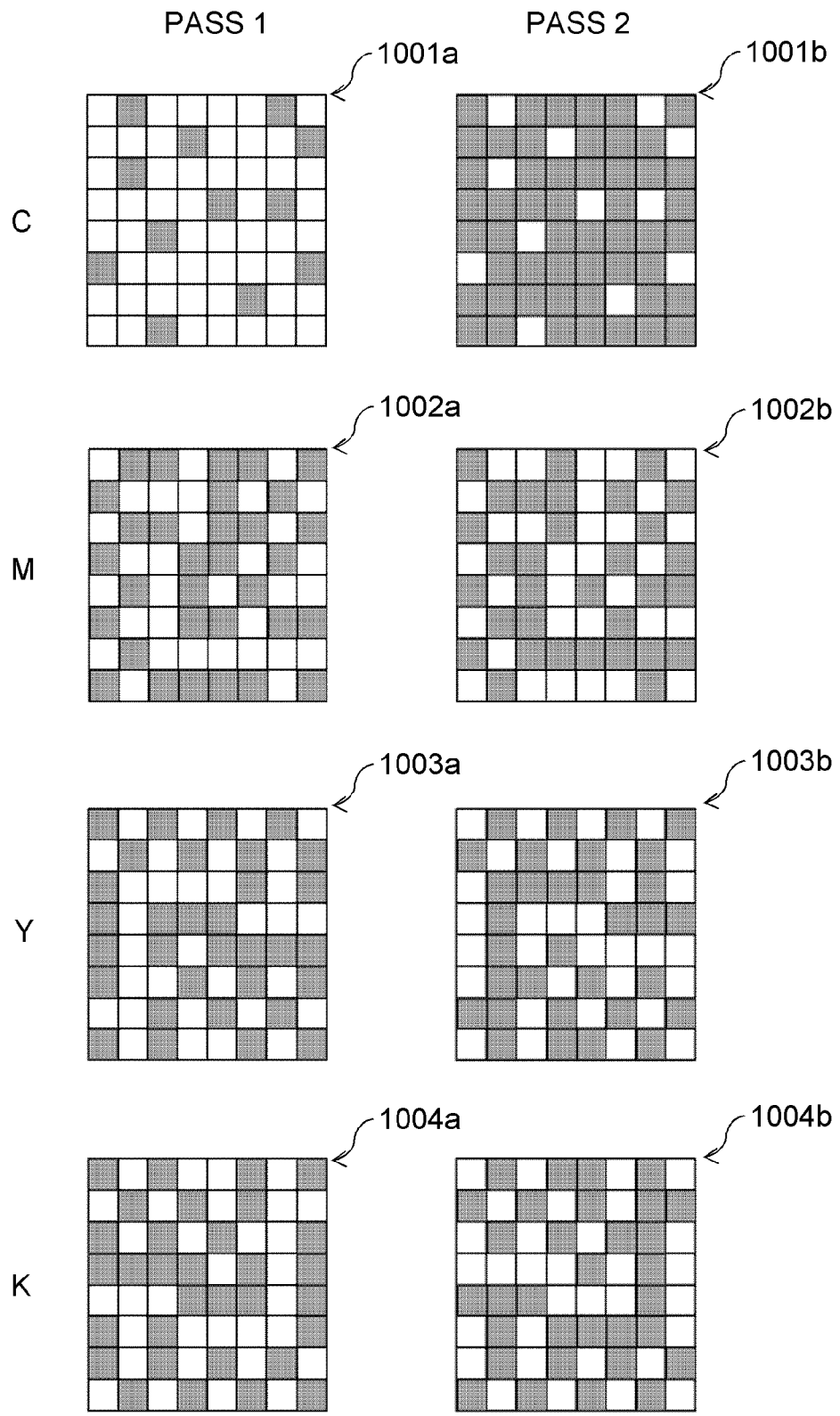
FIG. 10 is a schematic diagram of a set of partial masks generated for a partial area of an image in accordance with an embodiment of the present invention.

FIG. 10 shows an exemplary set of masks 1001-1004 generated for a partial area of an image in accordance with the two pass printmode 212 of FIG. 2 using a statistical allocation method. The masks 1001-1004 correspond to each of the composite CMYK colours respectively. Masks 1001*a*, 1002*a*, 1003*a* & 1004*a* correspond to the first pass (forward) and masks 1001*b*, 1002*b*, 1003*b* & 1004*b* correspond to the second pass (backward). Each mask corresponds to a particular image pixel, and is an eight by eight grid, each grid element corresponding to a device pixel. The shaded grid elements represent active device pixels and it can been seen that the cyan masks 1001*a* & 1001*b* have been generated such that approximately 20 percent of the device pixels are active on the first pass (mask 1001*a*) and 80 percent of the pixels are active on the second pass (1001*b*). Thus, at the macroscopic level, 20 percent of the cyan ink will be deposited on the first pass and 80 percent of the cyan ink will be deposited on the second pass. The magenta masks (1002*a* & 1002*b*), yellow masks (1003*a* & 1003*b*) and black masks (1004*a* & 1004*b*) have been generated such that the active elements are distributed evenly between the first and second passes, in accordance with printmode 312 of FIG. 3.

Figure 11:
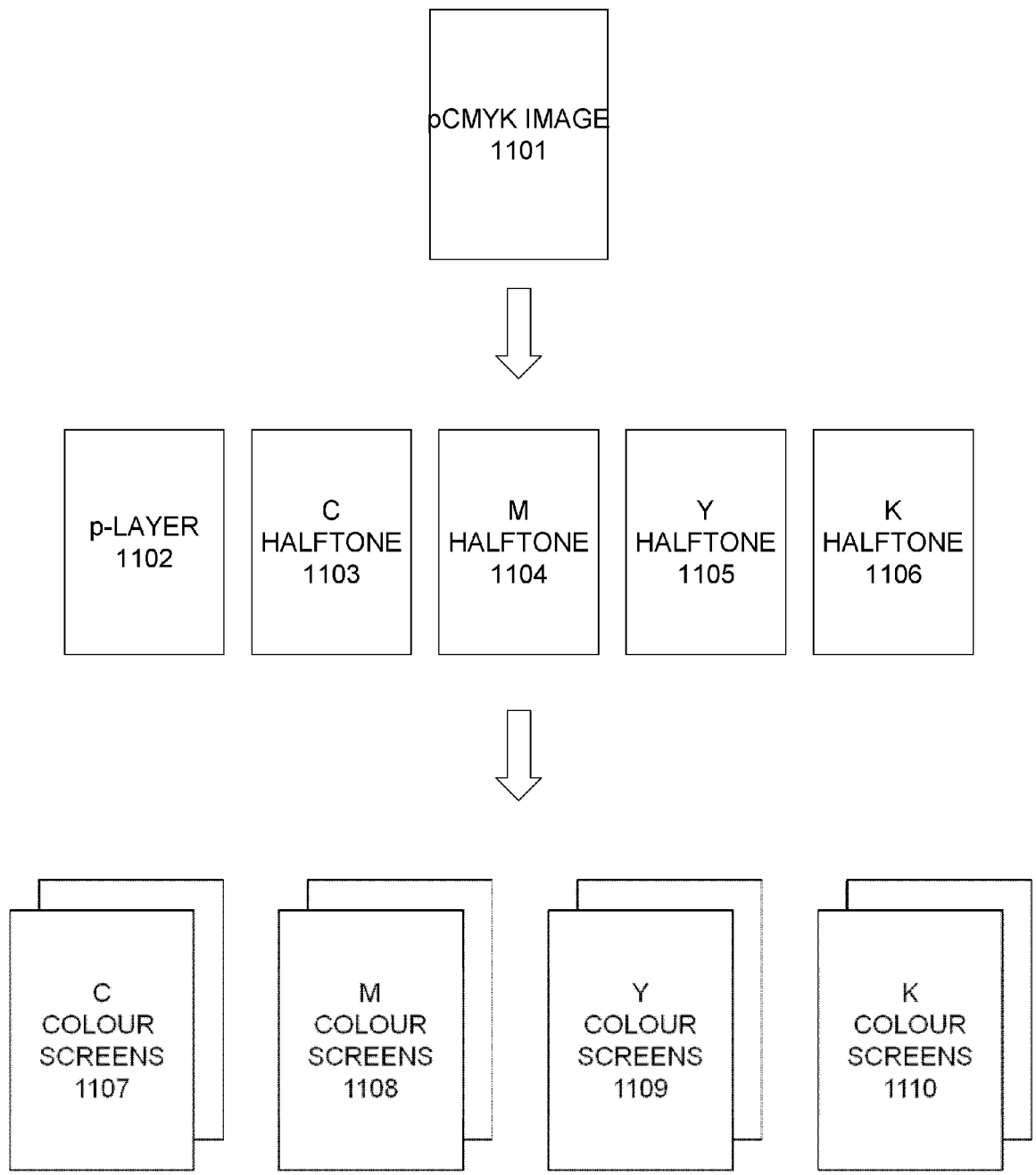
FIG. 11 is schematic diagram showing the halftone separation and colour screen separation in accordance with an embodiment of the present invention.

FIG. 11 shows the set of p-layer data (1102) halftone images (1103-1106) and colour screens (1107-1110) derived from an image in pCMYK format. An image in pCMYK format is first separated into the p-layer (1102) and the halftone images for each of the four composite colours (1103-1106). Following this separation, the colour screens (1107-1110) for each composite colour are generated and the p-layer is no longer necessary. FIG. 11 shows the halftone and colour screen component colours as separate layers for purposes of clarity. However, it will be appreciated by those skilled in the art that the separate layers may be conveniently combined into a single data file or data object such as to facilitate ease of manipulation and communication.

Figure 12:
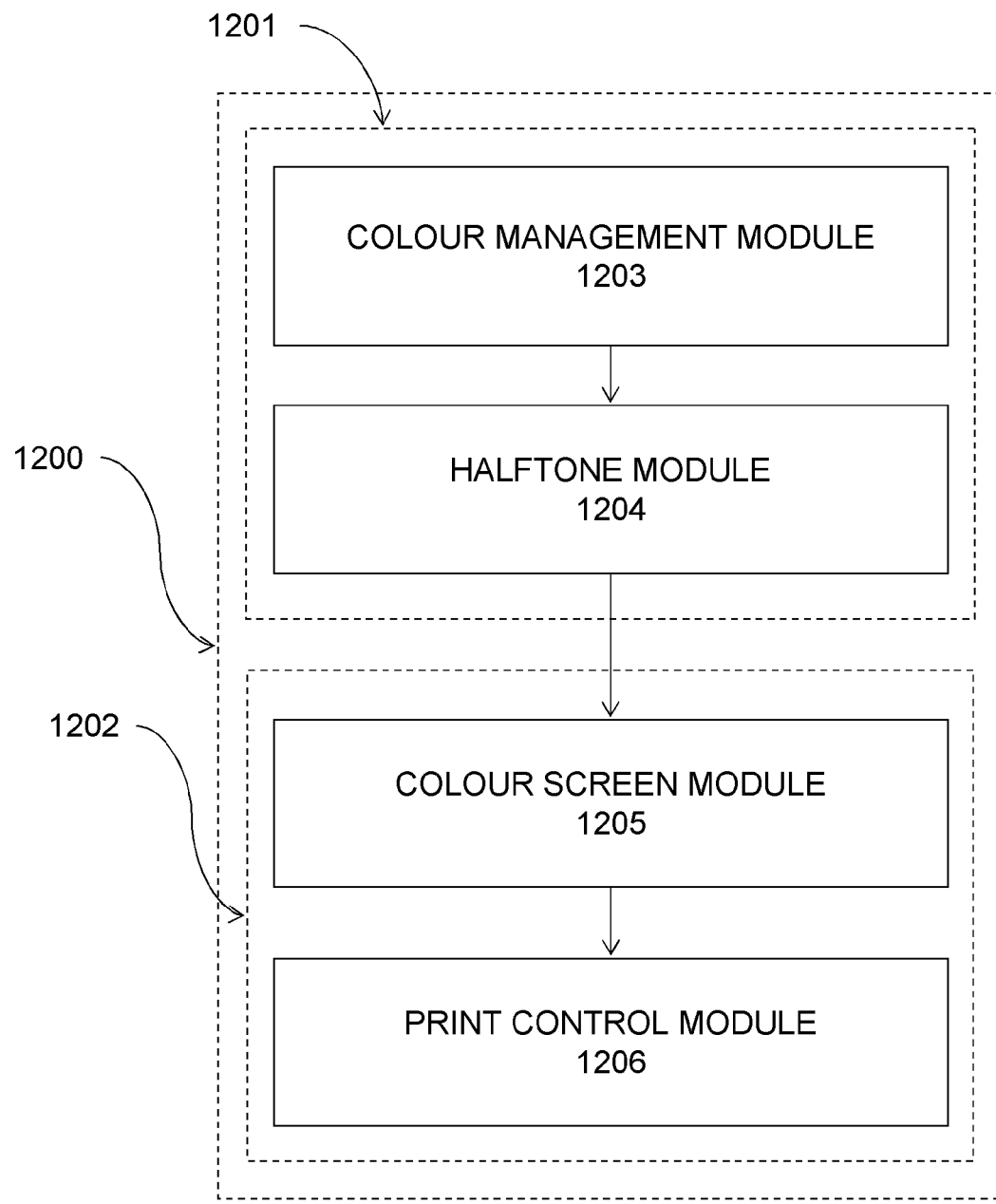
FIG. 12 is a diagram of a system for printing an image.

FIG. 12 shows a system 1200 for printing an image according to a further embodiment of the present invention. Again, the system comprises an attached device 1201 (for example the personal computer 101 of FIG. 1A) which is operably connected to the printing device 1202. The embodiment shown in FIG. 12 differs from that shown in FIG. 8 in that the colour screen module 1205 is included in the printing device 1202 rather than the attached device 1201. It will be appreciated by those skilled in the art that some or all of the modules shown in FIGS. 8 and 12 may be included in either the printing device or the attached device in various combinations. All such embodiments are intended to fall within the scope of the present invention.

The term "ink", as used herein, is intended to encompass any substance used for colouring a surface to produce and image, text or design. For example, the term ink may include but not be limited to solvent inks, UV-curable inks, dye sublimation inks, pigment based inks and polymer inks. Embodiments of the present invention as described herein are applicable to all ink types, and should be construed as such by a person of normal skill in the art.

The term "module", as used herein, includes but is not limited to hardware, firmware, software and/or combinations of each to perform a function(s) or an action(s), and/or to cause a function or action from another module, method, and/or system. For example, based on a desired application or need, 'module' may include a software controlled microprocessor, a discrete logic circuit, such as an application specific integrated circuit (ASIC), a programmed logic device, a memory device containing instructions, or the like. A hardware 'module' may include one or more gates, combinations of gates, or other circuit components. A module may also be fully embodied as software. Where multiple logical modules are described, it may be possible to incorporate the multiple logical modules into one physical module. Similarly, where a single logical module is described, it may be possible to distribute that single logical module between multiple physical modules. The following embodiments in no way limit the hardware and/or software arrangement that may be selected to implement the invention.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections. For example, two entities can be operably connected by being able to communicate signals to each other directly or through one or more intermediate entities like a processor, operating system, a module, software, or other entity. Logical and/or physical communication channels can be used to create an operable connection.

The term "software", as used herein, includes but is not limited to, one or more computer or processor instructions that can be read, interpreted, assembled, compiled, and/or executed and that cause a computer, processor, or other electronic device to perform functions, actions and/or behave in a desired manner. The instructions may be embodied in various forms such as routines, algorithms, modules, methods, threads, and/or programs including separate applications or code from dynamically and/or statically linked libraries. Software may also be embodied in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may depend, for example, on requirements of a desired application, the environment in which it runs, and/or the desires of a designer/programmer or the like. It will also be appreciated that computer-readable and/or executable instructions can be located in one module and/or distributed between two or more communicating, co-operating, and/or parallel processing modules and thus can be loaded and/or executed in serial, parallel, massively parallel and other manners.

Suitable software for implementing the various components of the example systems and methods described herein may be produced using programming languages and tools including but not limited to Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium. Another form of the software may include signals that transmit program code of the software to a recipient over a network or other communication medium. Thus, in one example, a computer-readable medium stores information that can be read as a form of signals that represent the software/firmware as it is downloaded from a web server to a user. In another example, the computer-readable medium stores information that can be read and interpreted as software/firmware as it is maintained on a web server. Other forms may also be used.

The term "data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, fewer than all of the illustrated blocks may be required to implement an example methodology. Furthermore, additional and/or alternative methodologies can employ additional, not illustrated blocks.

The above embodiments are to be understood as illustrative examples of the invention. Further embodiments of the invention are envisaged. For example, the printing device may include a larger or smaller number of composite ink colours and/or operate according to a different colour space. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A printing device for printing an image comprising a plurality of pixels, the system comprising:
   a carriage arranged to make a plurality of passes along a scanning axis with respect to a print medium, the passes including one or more forward passes and one or more backward passes;
   a plurality of printheads mounted on the carriage, each printhead corresponding to a different ink colour and comprising at least one ejection nozzle; and,
   a print controller configured to receive data defining for each pass zero or more locations at which to deposit each of the ink colours to produce each pixel;
   wherein at least one first ink colour of the ink colours is deposited just during the forward passes or just during the backward passes, and at least one second ink colour of the ink colours is deposited during both the forward passes and the backward passes;
   wherein the print head is to deposit the ink colours to print the image in accordance with a print mode corresponding to a color gamut of the image, the print mode indicating a first specification of an order in which the ink colours are deposited, the print mode indicating a second specification of the at least one first ink colour to be deposited just during the forward or just during the backward passes, and the print mode indicating a third specification of the at least one second ink colour to be deposited during both the forward and the backward passes;
   wherein the first specification, the second specification, and the third specification together ensure that the image as printed in accordance with the print mode achieves the color gamut.

2. The printing device of claim 1, wherein the data associated with at least one pixel is generated based a printmode which defines a proportion of each colour ink to deposit on each pass.

3. The printing device of claim 2, wherein the locations at which to deposit each of the ink colours to produce the pixel are determined on the basis of the associated printmode.

4. The printing device of claim 3, wherein the system further comprises a colour management module configured to convert data from a first colour space to a second colour space.

5. The printing device of claim 4, wherein at least one colour in the second colour space is associated with a printmode.

6. The printing device of claim 5, wherein the associated printmode is selected to optimise the gamut of the printing device.

7. The printing device of claim 5, wherein the associated printmode is selected to minimise colour banding for the associated colour.

8. A method of printing an image comprising a plurality of pixels using printing device, the printing device comprising a plurality of printheads mounted on a carriage, each printhead corresponding to a different ink colour and comprising at least one ejection nozzle, the carriage arranged to make a plurality of passes along a scanning axis with respect to a print medium, the method comprising the steps of:
   receiving data defining for each pass zero or more locations at which to deposit each of the ink colours to produce each pixel; and,
   operating the carriage and the plurality of printheads to deposit each colour ink at the zero or more locations on each pass as defined by the data;
   wherein the data is such that for at least one pixel, at least one of the ink colours is deposited at substantially more locations on one pass relative to the other passes;
   wherein the passes include one or more forward passes and one or more backward passes;
   wherein at least one first ink colour of the ink colours is deposited just during the forward passes or just during the backward passes, and at least one second ink colour of the ink colours is deposited during both the forward passes and the backward passes;
   wherein the print head is to deposit the ink colours to print the image in accordance with a print mode corresponding to a color gamut of the image, the print mode indicating a first specification of an order in which the ink colours are deposited, the print mode indicating a second specification of the at least one first ink colour to be deposited just during the forward or just during the backward passes, and the print mode indicating a third specification of the at least one second ink colour to be deposited during both the forward and the backward passes;
   wherein the first specification, the second specification, and the third specification together ensure that the image as printed in accordance with the print mode achieves the color gamut.

9. The method of claim 8, wherein the method further comprises generating the data associated with at least one pixel based on a printmode which defines a proportion of each colour ink to deposit on each pass.

10. The method of claim 9, wherein the method further comprises determining the locations at which to deposit each of the ink colours to produce the pixel on the basis of the associated printmode.

11. The method of claim 10, wherein the method further comprises converting data from a first colour space to a second colour space.

12. The method of claim 11, wherein the method further comprises associating at least one colour in the second colour space with a printmode.

13. The method of claim 12, wherein the method further comprises selecting the associated printmode to optimise the gamut of the printing device.

14. The method of claim 12, wherein the method further comprises selecting the associated printmode to minimise colour banding for the associated colour.

15. A method for processing an image, the method comprising the steps of:
   receiving an image comprising a plurality of pixels, the image defined in a first colour space; and,
   converting the image to second colour space;
   wherein at least one colour in the second colour space is associated with a printmode which defines a proportion of each colour ink to deposit on each of a plurality of passes of a carriage;
   wherein the passes include one or more forward passes and one or more backward passes; wherein at least one first ink colour of the ink colours is deposited just during the forward passes or just during the backward passes, and at least one second ink colour of the ink colours is deposited during both the forward passes and the backward passes;
   wherein the print head is to deposit the ink colours to print the image in accordance with a print mode corresponding to a color gamut of the image, the print mode indicating a first specification of an order in which the ink colours are deposited, the print mode indicating a second specification of the at least one first ink colour to be deposited just during the forward or just during the backward passes, and the print mode indicating a third specification of the at least one second ink colour to be deposited during both the forward and the backward passes;
   wherein the first specification, the second specification, and the third specification together ensure that the image as printed in accordance with the print mode achieves the color gamut.

16. The method of claim 15, wherein the method further comprises generating data defining for each pass of the carriage, zero or more locations at which to deposit each of a plurality of ink colours to produce each pixel.

17. The method of claim 16, wherein the method further comprises determining the zero or more locations for each pass on the basis of the printmode associated with each pixel.

18. The method of claim 17, wherein the method further comprises selecting the associated printmode to optimise the gamut of the printing device.

19. The method of claim 17, wherein the method further comprises selecting the associated printmode to minimise colour banding for the associated colour.

20. A computer program embodied in a non-transitory computer readable medium comprising instructions to enact the method of claim 15.

* * * * *

UNITED STATES PATENT AND TRADEMARK OFFICE
CERTIFICATE OF CORRECTION

PATENT NO. : 8,467,114 B2
APPLICATION NO. : 12/424520
DATED : June 18, 2013
INVENTOR(S) : Igor Yakubov Page 1 of 1

It is certified that error appears in the above-identified patent and that said Letters Patent is hereby corrected as shown below:

In the Claims

In column 12, line 59, in Claim 2, after "based" insert -- on --.

Signed and Sealed this
Seventeenth Day of September, 2013

Teresa Stanek Rea
*Deputy Director of the United States Patent and Trademark Office*